US011827192B2

(12) United States Patent
Wakabayashi

(10) Patent No.: US 11,827,192 B2
(45) Date of Patent: Nov. 28, 2023

(54) ELECTRONIC CONTROL UNIT AND BRAKE CONTROL DEVICE

(71) Applicant: Hitachi Automotive Systems, Ltd., Hitachinaka (JP)

(72) Inventor: Katsuhiko Wakabayashi, Takasaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 680 days.

(21) Appl. No.: 16/959,917

(22) PCT Filed: Dec. 26, 2018

(86) PCT No.: PCT/JP2018/047695
§ 371 (c)(1),
(2) Date: Jul. 2, 2020

(87) PCT Pub. No.: WO2019/142628
PCT Pub. Date: Jul. 25, 2019

(65) Prior Publication Data

US 2021/0070271 A1 Mar. 11, 2021

(30) Foreign Application Priority Data

Jan. 17, 2018 (JP) ................................ 2018-005509

(51) Int. Cl.
*B60T 13/68* (2006.01)
*B60T 13/66* (2006.01)
(Continued)

(52) U.S. Cl.
CPC ............ *B60T 13/662* (2013.01); *B60T 13/16* (2013.01); *B60T 13/686* (2013.01);
(Continued)

(58) Field of Classification Search
CPC ...... B60T 8/4036; B60T 8/885; B60T 13/686; B60T 2270/414; B60T 2270/402;
(Continued)

(56) References Cited

U.S. PATENT DOCUMENTS 8,744,711 B2 6/2014 Heise et al.
2003/0030322 A1* 2/2003 Yokoyama ............ B60T 8/3255 303/122.04
(Continued)

FOREIGN PATENT DOCUMENTS

JP 2010120624 A * 6/2010
JP 5262965 B2 8/2013
WO WO 2017/203806 A1 11/2017

OTHER PUBLICATIONS

Machine translation of JP 2010-120624, retrieved Feb. 9, 2023 (Year: 2023).*

(Continued)

*Primary Examiner* — Bradley T King
(74) *Attorney, Agent, or Firm* — Crowell & Moring LLP

(57) ABSTRACT

A control unit comprises a first power source line connecting a vehicle power source and a motor, a second power source line connecting the vehicle power source and a plurality of electromagnetic valves, a solenoid relay arranged in a second power source line, a link line connecting a portion of the second power source line, which extends between the solenoid relay and the plurality of electromagnetic valves, to the first power source line, and a link relay arranged in the link line.

14 Claims, 9 Drawing Sheets

(51) Int. Cl.
*B60T 13/16* (2006.01)
*B60T 17/22* (2006.01)

(52) U.S. Cl.
CPC ....... *B60T 17/221* (2013.01); *B60T 2270/402* (2013.01); *B60T 2270/414* (2013.01)

(58) Field of Classification Search
CPC ...... B60T 17/22; B60T 17/221; B60T 13/662; B60T 13/16
See application file for complete search history.

(56) References Cited

U.S. PATENT DOCUMENTS

2007/0222284 A1* 9/2007 Matsubara .............. B60T 17/18 303/122.04
2011/0077831 A1* 3/2011 Nishino .................. B60T 7/042 701/70
2015/0061362 A1* 3/2015 Kikawa ................. B60T 8/4077 303/14
2019/0061727 A1 2/2019 Mizusaki et al.

OTHER PUBLICATIONS

English translation of document C2 (Japanese-language Written Opinion (PCT/ISA/237) previously filed on Jul. 2, 2020) issued in PCT Application No. PCT/JP2018/047695 dated Mar. 12, 2019 (seven (7) pages).
International Search Report (PCT/ISA/210) issued in PCT Application No. PCT/JP2018/047695 dated Mar. 12, 2019 with English translation (two (2) pages).
Japanese-language Written Opinion (PCT/ISA/237) issued in PCT Application No. PCT/JP2018/047695 dated Mar. 12, 2019 (five (5) pages).

* cited by examiner

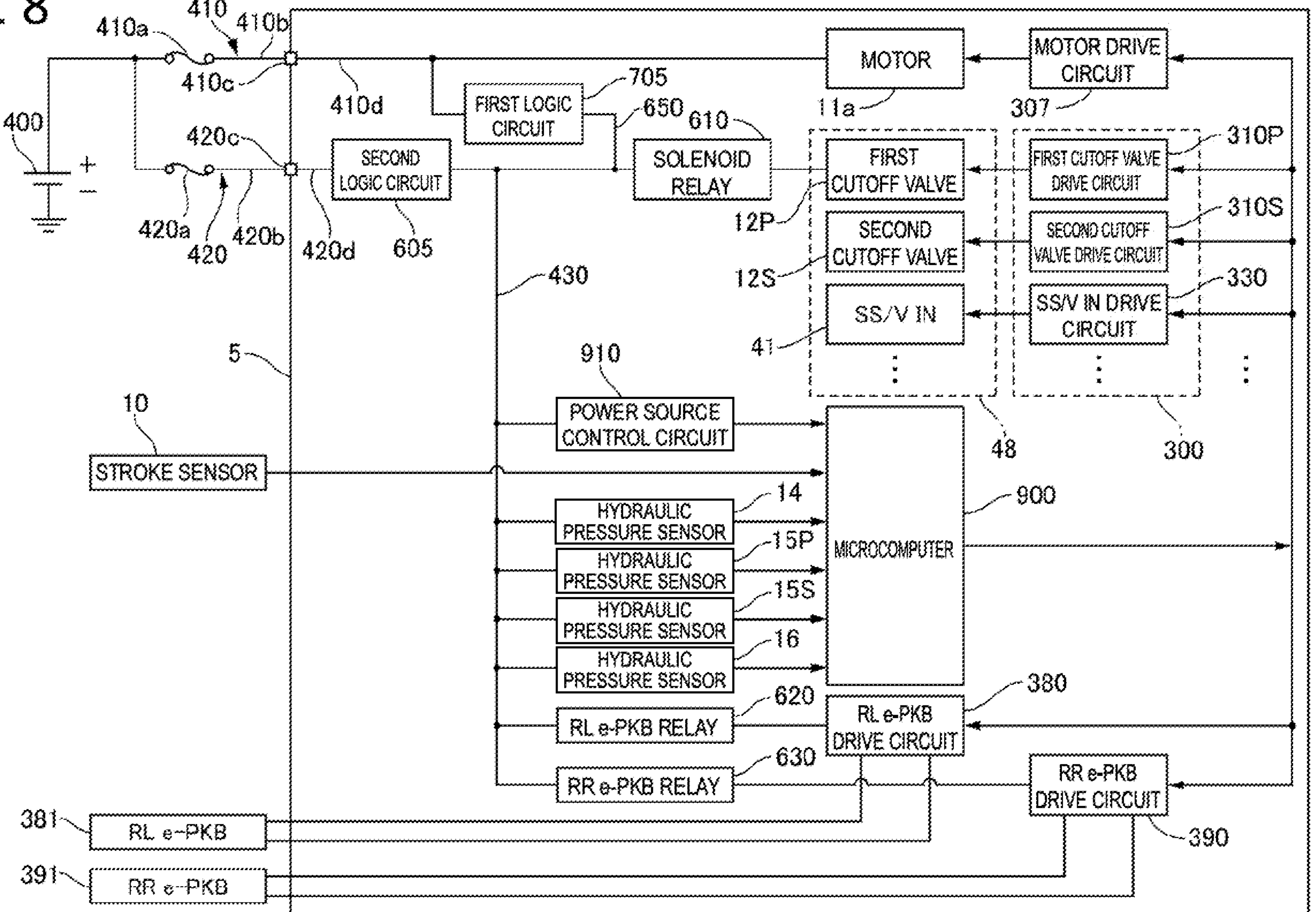
Fig. 8
410a
410
410b
410c
410d
400
420c
420a
420
420b
420d
SECOND LOGIC CIRCUIT
605
FIRST LOGIC CIRCUIT
705
650
610
SOLENOID RELAY
MOTOR
11a
MOTOR DRIVE CIRCUIT
307
FIRST CUTOFF VALVE
12P
SECOND CUTOFF VALVE
12S
SS/V IN
41
FIRST CUTOFF VALVE DRIVE CIRCUIT
310P
SECOND CUTOFF VALVE DRIVE CIRCUIT
310S
SS/V IN DRIVE CIRCUIT
330
48
300
430
5
910
POWER SOURCE CONTROL CIRCUIT
10
STROKE SENSOR
HYDRAULIC PRESSURE SENSOR
14
15P
15S
16
MICROCOMPUTER
900
RL e-PKB RELAY
620
RR e-PKB RELAY
630
RL e-PKB DRIVE CIRCUIT
380
RR e-PKB DRIVE CIRCUIT
390
381
RL e-PKB
391
RR e-PKB

ELECTRONIC CONTROL UNIT AND BRAKE CONTROL DEVICE

TECHNICAL FIELD

The invention relates to an electronic control unit and a brake control device.

BACKGROUND ART

Patent Literature 1 discloses an electronic control unit that is intended to avoid improper functioning in the event of a failure in a power source of a brake control device. The electronic control unit supplies power source from a plurality of power source systems through a logic circuit to a plurality of loads.

CITATION LIST

Patent Literature

PTL 1: U.S. Pat. No. 8,744,711 B2

SUMMARY OF INVENTION

Technical Problem

The aforementioned conventional art makes redundant power supply to each load, which complicates a power circuit.

Solution to Problem

An object of the invention is to provide an electronic control unit and a brake control device, which prevent complication of a power circuit.

The electronic control unit according to one embodiment of the invention comprises a first power source line connecting an electric power source and a first load, a second power source line connecting the electric power source and a second load, a first connecting function portion arranged in the second power source line, a link line connecting a portion of the second power source line, which extends between a first connecting function portion and a second load, to a first power source line, and a second connecting function portion arranged in the link line.

One embodiment of the invention thus represses complication of the power circuit.

BRIEF DESCRIPTION OF DRAWINGS

FIG. 8 is a control circuit diagram of a brake control device 1 according to the Embodiment 2.

DESCRIPTION OF EMBODIMENTS

Embodiment 1

Figure 1:
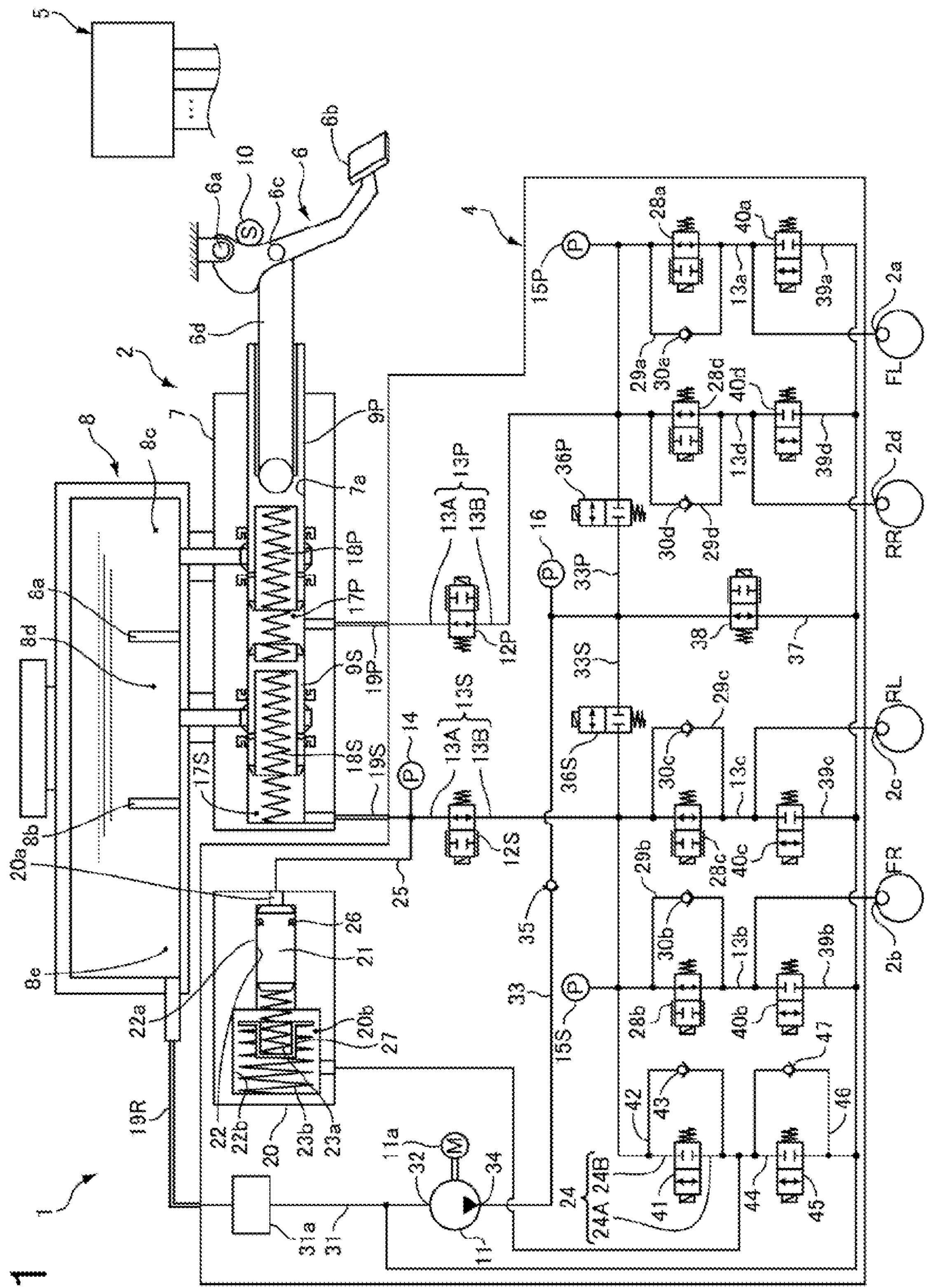
FIG. 1 is a configuration diagram of a brake control device 1 that is common to both Embodiment 1 and Embodiment 2.

FIG. 1 is a configuration diagram of a brake control device 1 according to Embodiment 1.

The brake control device 1 includes a hydraulic brake device that is suitable for electric vehicles. The electric vehicles include hybrid vehicles, electric automobiles, and other like electric vehicles. As power plants for driving wheels, the hybrid vehicles are provided with engines and motor generators, and the electric automobiles only with motor generators. The brake control device 1 may be applied to a vehicle using only an engine as a driving force source. The brake control device 1 supplies brake fluid to wheel cylinders 2*a* to 2*d* of a brake unit, which are fixed to vehicle wheels (left front wheel FL, right front wheel FR, left rear wheel RL, and right rear wheel RR). When pads located on a vehicle body side are pressed against rotors located on a wheel side in accordance with hydraulic brake pressure (wheel cylinder hydraulic pressure Pw) of the wheel cylinders 2*a* to 2*d*, a braking force generated by friction is provided to the wheels. The wheel cylinders 2 here may be cylinders of hydraulic brake calipers in a disc brake mechanism or may be wheel cylinders of a drum brake mechanism. The brake control device 1 includes a dual system brake pipe line which includes P (primary)- and S (secondary)-systems. The brake control device 1 adopts an X-type piping. The brake control device 1 may adopt another type piping, such as a front-rear piping. Hereinafter, when a distinction is needed between members corresponding to the P-system and members corresponding to the S-system, reference signs of the members are provided at ends with subscripts P and S, respectively.

The brake control device 1 includes a master cylinder unit 3, a hydraulic unit 4, and a control unit (electronic control unit) 5.

The master cylinder unit 3 includes a brake pedal 6, a master cylinder 7, and a reservoir tank 8. The brake pedal 6 is a brake operation member that receives an input of brake operation by the driver. The brake pedal 6 is of a so-called suspension type and is rotatably supported at a proximal end by a shaft 6*a*. Fixed to a distal end of the brake pedal 6 is a pad 6*b* that is a target to be pressed by the driver. One end of a pushrod 6*d* is rotatably connected through a shaft 6*c* to the brake pedal 6 at a location close to the proximal end of the brake pedal 6 between the shaft 6*a* and the pad 6*b*.

The master cylinder 7 is activated by the driver's operation of the brake pedal (brake operation) and generates master cylinder hydraulic pressure Pm. The brake control device 1 does not have a negative booster that boosts a brake operation force produced by the driver (pedal effort F on the brake pedal 6) using intake negative pressure that is generated by a vehicle engine. The brake control device 1 therefore can be downsized and is suitable as a brake system for an electric vehicle without a negative pressure source (which is an engine in many cases). The master cylinder 7 is connected to the brake pedal 6 through the pushrod 6*d* and replenished with brake fluid from the reservoir tank 8.

The reservoir tank 8 stores brake fluid. The brake fluid stored in the reservoir tank 8 is open to the atmosphere. An internal space of the reservoir tank 8 on a bottom portion side (lower side in a vertical direction) is divided by two partition members 8*a* and 8*b* having predetermined height into three spaces which include a primary hydraulic chamber space 8*c*, a secondary hydraulic chamber space 8*d*, and a pump suction space 8*e*.

The master cylinder 7 is of a tandem type. The master cylinder 7 includes a primary piston 9P and a secondary piston 9S as master cylinder pistons that move in an axial direction in response to the brake operation. The pistons 9P and 9S are arranged in series. The primary piston 9P is connected to the pushrod 6*d*. The secondary piston 9S is of a free piston-type.

A stroke sensor 10 is fixed to the brake pedal 6. The stroke sensor 10 detects a displacement amount of the brake pedal 6 (pedal stroke S). The stroke sensor 10 may detect piston strokes of the pushrod 6*d* or the primary piston 9P. In such a case, the pedal stroke S corresponds to a value obtained by multiplying an axial displacement amount (stroke amount) of the pushrod 6*d* or the primary piston 9P by a pedal ratio K of the brake pedal. K is a ratio of S to the stroke amount of the primary piston 9P and set to a predetermined value. K is calculated, for example, from a ratio of distance between the shaft 6*a* and the pad 6*b* to distance between the shaft 6*a* and the shaft 6*c*.

A stroke simulator 20 is actuated in accordance with the driver's brake operation and generates the pedal stroke S when the brake fluid that flows out of the master cylinder 7 enters into the stroke simulator 20. The stroke simulator 20 includes a piston 21 that axially moves in a cylinder 22 in accordance with an amount of the brake fluid supplied from the master cylinder 7, to thereby generate an operation reaction force along with the driver's brake operation.

The hydraulic unit 4 adjusts the wheel cylinder hydraulic pressure Pw independently of the driver's brake operation. The control unit 5 controls the actuation of the hydraulic unit 4. The hydraulic unit 4 is supplied with the brake fluid from the reservoir tank 8 or the master cylinder 7. The hydraulic unit 4 is interposed between the wheel cylinders 2 on one side and the master cylinder 7 on the other. The hydraulic unit 4 supplies the master cylinder hydraulic pressure Pm or hydraulic control pressure to the wheel cylinders 2 individually. The hydraulic unit 4 includes a motor 11*a* of a pump 11 and a plurality of electromagnetic valves (cutoff valves 12 and other valves) as hydraulic devices for generating the hydraulic control pressure. The pump 11 sucks in the brake fluid from a brake fluid source (reservoir tank 8 or the like) other than the master cylinder 7 and discharges the brake fluid toward the wheel cylinders 2. The pump 11 is, for example, a plunger pump or a gear pump. The pump 11 is common to both the systems and rotationally driven by the electric motor 11*a* functioning as the same drive source. The motor 11*a* is, for example, a DC brush motor or a brushless motor. The electromagnetic valves and the other valves are opened/closed in accordance with control signals to switch a communication state of first fluid passages 13 or the like (connecting fluid passages) connecting the master cylinder 7 to the wheel cylinders 2. The brake fluid is thus controlled in flow. The hydraulic unit 4 is capable of pressurizing the wheel cylinders 2 using the hydraulic pressure generated by the pump 11 while communication between the master cylinder 7 and the wheel cylinders 2 is disconnected. The hydraulic unit 4 includes hydraulic pressure sensors 14 to 16 that detect hydraulic pressures at respective points, which include a discharge pressure of the pump 11, Pm, and the like.

A primary hydraulic pressure chamber 17P is defined between the pistons 9P and 9S of the master cylinder 7. A coil spring 18P in a compressed position is situated in the primary hydraulic pressure chamber 17P. A secondary hydraulic pressure chamber 17S is defined between the piston 9S and a bottom surface of a cylinder 7*a*. A coil spring 18S in a compressed position is situated in the secondary hydraulic pressure chamber 17S. The first fluid passages 13 open into the hydraulic pressure chambers 17P and 17S. The hydraulic pressure chambers 17P and 17S are connected to the hydraulic unit 4 through the first fluid passages 13 and allowed to come into communication with the wheel cylinders 2. The primary hydraulic pressure chamber 17P and the secondary hydraulic pressure chamber 17S are connected to the first fluid passage 13P and the first fluid passage 13S of the hydraulic unit 4 through brake pipe lines 19P and 19S, respectively. The brake pipe lines 19P and 19S form part of the first fluid passages 13.

When the piston 9 strokes in response to the driver's stepping operation on the brake pedal 6, the hydraulic pressure chambers 17P and 17S are decreased in volume, and hydraulic pressures Pm are generated in accordance with the volume decrease. The hydraulic pressures Pm generated in the hydraulic pressure chambers 17P and 17S are substantially equal to each other. The brake fluid is thus supplied from the hydraulic pressure chambers 17 through the first fluid passages 13 toward the wheel cylinders 2. The master cylinder 7 is capable of pressurizing the wheel cylinders 2*a* and 2*d* of the P-system through the fluid passage (first fluid passage 13P) of the P-system using the Pm generated in the primary hydraulic pressure chamber 17P. The master cylinder 7 is further capable of pressurizing the wheel cylinders 2*b* and 2*c* of the S-system through the fluid passage (first fluid passage 13S) of the S-system using the Pm generated in the secondary hydraulic pressure chamber 17S.

A configuration of the stroke simulator 20 will be now discussed. The stroke simulator 20 includes a cylinder 22, a piston 21, and a spring 23. FIG. 1 shows a cross-section along an axis of the cylinder 22. The cylinder 22 has a cylindrical shape and has a circular cylinder-shaped inner peripheral surface. The cylinder 22 includes a piston housing portion 22*a* and a spring housing portion 22*b*. The spring housing portion 22*b* has an inner peripheral surface that is larger in diameter than an inner peripheral surface of the piston housing portion 22*a*. The piston 21 is linearly movably situated on an inner periphery side of the piston housing portion 22*a* along the inner peripheral surface of the piston housing portion 22*a*. The piston 21 is a separation member (partition wall) that separates an internal space of the cylinder 22 into at least two chambers (positive pressure chamber 20*a* and back pressure chamber 20*b*). The positive pressure chamber 20*a* and the back pressure chamber 20*b* are defined across the piston 21 in the internal space of the cylinder 22. A second fluid passage 25 normally opens into the positive pressure chamber 20*a*. A third fluid passage 24 normally opens into the back pressure chamber 20*b*.

A piston seal 26 is situated on an outer periphery of the piston 21 to extend around an axis of the piston 21 (in a circumferential direction). The piston seal 26 is in sliding contact with the inner peripheral surface of the cylinder 22 (piston housing portion 22*a*) and seals a gap between the inner peripheral surface of the piston housing portion 22*a* and an outer peripheral surface of the piston 21. The piston seal 26 is a separation seal member that seals a gap between the positive pressure chamber 20*a* and the back pressure chamber 20*b* to separate the chambers 20*a* and 20*b* in a fluid-tight manner. The piston seal 26 complements a function of the piston 21 working as the separation member. The spring 23 is a coil spring situated in the back pressure chamber 20*b* in a contracted position. The spring 23 constantly biases the piston 21 in such a direction that the positive pressure chamber 20*a* is decreased in volume. The spring 23 generates a reaction force in accordance with a displacement amount (stroke amount) of the piston 21. The spring 23 includes a first spring 23*a* and a second spring 23*b*. The first spring 23*a* is smaller in diameter and shorter in length than the second spring 23*b*. The first spring 23*a* is smaller in wire diameter than the second spring 23*b*. The first spring 23*a* has a smaller spring constant than the second spring 23*b*. The first and second springs 23*a* and 23*b* are arranged in series between the piston 21 and the cylinder 22 (spring housing portion 22*b*) with a retainer member 27 intervening therebetween.

A hydraulic circuit of the hydraulic unit 4 will be now discussed. Reference signs of members corresponding to the wheels are provided at ends with subscripts a to d for proper distinction. The first fluid passages 13 connect the hydraulic pressure chambers 17 of the master cylinder 7 to the wheel cylinders 2. A first cutoff valve 12P and a second cutoff valve 12S are normally-open (open in a non-energized state) electromagnetic valves situated in the first fluid passages 13. The first fluid passages 13 are separated by the cutoff valves 12 into fluid passages 13A on the master cylinder 7 side and fluid passages 13B on the wheel cylinder 2 side. Solenoid in valves (SOL/V IN) 28 are normally-open electromagnetic valves situated in the first fluid passages 13 at locations closer to the wheel cylinders 2 (fluid passages 13B) than to the cutoff valves 12 to be disposed (in the fluid passages 13*a* to 13*d*) correspondingly to the wheels. Bypass fluid passages 29, bypassing the SOL/V IN 28, are situated in parallel with the first fluid passages 13. Situated in the bypass fluid passages 29 are check valves 30 that allow the brake fluid to flow only in a direction from the wheel cylinder 2 side toward the master cylinder 7.

A suction fluid passage 31 is a fluid passage connecting the reservoir tank 8 and a suction portion 32 of the pump 11. In the hydraulic unit 4, a fluid pool portion 31*a* having predetermined volume is formed above the suction fluid passage 31. The fluid pool portion 31*a* is located close to a vertically upper end of the hydraulic unit 4 in the vicinity of a portion (in a vertically upper side of the hydraulic unit 4), to which a brake pipe line 19R is connected. The pump 11 sucks in the brake fluid through the fluid pool portion 31*a*. A discharge fluid passage 33 connects a discharge portion 34 of the pump 11 to a portion of the first fluid passages 13B, which extends between the cutoff valves 12 on one side and the SOL/V IN 28 on the other. A check valve 35 is situated in the discharge fluid passage 33. The check valve 35 allows the brake fluid to flow only in a direction from the discharge portion 34 side (upstream) of the pump 11 toward the first fluid passages 13 (downstream). The check valve 35 is a discharge valve provided to the pump 11.

The discharge fluid passage 33 diverges into a fluid passage 33P of the P-system and a fluid passage 33S of the S-system on the downstream side of the check valve 35. The fluid passages 33P and 33S are connected to the first fluid passages 13P and 13S of the P- and S-systems. The fluid passages 33P and 33S function as communication fluid passages connecting the first fluid passages 13P and 13S. Communication valves 36P and 36S are normally-closed (closed in a non-energized state) electromagnetic valves situated in the fluid passages 33P and 33S. The pump 11 generates hydraulic pressure in the first fluid passages 13 using the brake fluid supplied from the reservoir tank 8, to thereby generate the hydraulic pressure Pw in the wheel cylinders 2. The pump 11 is connected to the wheel cylinders 2*a* to 2*d* through the communication fluid passages (discharge fluid passages 33P and 33S) and the first fluid passages 13P and 13S. The pump 11 discharges the brake fluid into the communication fluid passages (discharge fluid passages 33P and 33S) to pressurize the wheel cylinders 2.

A first decompression fluid passage 37 connects a portion of the discharge fluid passage 33, which extends between the check valve 35 and the communication valves 36, to the suction fluid passage 31. A pressure adjusting valve 38 is a normally-open electromagnetic valve situated in the first decompression fluid passage 37. The pressure adjusting valve 38 may be of a normally-closed type. Second decompression fluid passages 39 each connect a portion of each of the first fluid passages 13B, which extends from the SOL/V IN 28 toward the corresponding wheel cylinder 2, to the suction fluid passage 31. Solenoid out valves (SOL/V OUT) 40 are normally-closed electromagnetic valves situated in the second decompression fluid passages 39. According to the Embodiment 1, a portion of the first decompression fluid passage 37, which extends from the pressure adjusting valve 38 toward the suction fluid passage 31, and a portion of each of the second decompression fluid passages 39, which extends from the SOL/V OUT 40 toward the suction fluid passage 31, partially coincide with each other.

The second fluid passage 25 diverges from the first fluid passage 13A and is connected to the positive pressure chamber 20*a* of the stroke simulator 20. The second fluid passage 25 may directly connect the secondary hydraulic pressure chamber 17S and the positive pressure chamber 20*a* without the first fluid passage 13A.

The third fluid passage 24 connects the back pressure chamber 20*b* of the stroke simulator 20 and the first fluid passages 13. Specifically, the third fluid passage 24 diverges from a portion of the first fluid passage 13S (fluid passage 13B), which extends between the cutoff valve 12S and the SOL/V IN 28, and is connected to the back pressure chamber 20*b*. A stroke simulator in valve (SS/V IN) 41 is a normally-closed electromagnetic valve situated in the third fluid passage 24. The third fluid passage 24 is divided by the SS/V IN 41 into a fluid passage 24A on the back pressure chamber 20*b* side and a fluid passage 24B on the first fluid passage 13 side. A bypass fluid passage 42, bypassing the SS/V IN 41, is situated in parallel with the third fluid passage 24. The bypass fluid passage 42 connects the fluid passage 24 and the fluid passage 13B. A check valve 43 is situated in the bypass fluid passage 42. The check valve 43 allows the brake fluid to flow from the back pressure chamber 20*b* side (fluid passage 24) toward the first fluid passage 13 (fluid passage 13B) and represses a reverse brake fluid flow.

A fourth fluid passage 44 connects the back pressure chamber 20*b* of the stroke simulator 20 and the reservoir tank 8. The fourth fluid passage 44 connects a portion of the third fluid passage 24, which extends between the back pressure chamber 20*b* and the SS/V IN 41 (fluid passage 24), to the suction fluid passage 31 (or a portion of the first compression fluid passage 37, which extends from the pressure adjusting valve 38 toward the suction fluid passage 31 and a portion of the second compression fluid passage 39, which extends from the SOL/V OUT 40 toward the suction fluid passage 31). The fourth fluid passage 44 may be connected directly to the back pressure chamber 20*b* and the reservoir tank 8. A stroke simulator out valve (SS/V OUT) 45 is a normally-closed electromagnetic valve situated in the fourth fluid passage 44. A bypass fluid passage 46, bypassing the SS/V OUT 45, is situated in parallel with the fourth fluid passage 44. A check valve 47 is situated in the bypass fluid passage 46. The check valve 47 allows the brake fluid to flow from the reservoir tank 8 (suction fluid passage 31) side toward the third fluid passage 24, namely the back pressure chamber 20*b*, and represses a reverse brake fluid flow.

The cutoff valves 12, the SOL/V IN 28, and the pressure adjusting valve 38 are proportional control valves that are adjusted in valve opening in accordance with current supplied to solenoids. The other valves, namely the SS/V IN 41, the SS/V OUT 45, the communication valves 36, and the SOL/V OUT 40, are two position valves (on-off valves) whose opening and closing are controlled in a binary switching manner. The aforementioned other valves may be proportional control valves. The hydraulic pressure sensor 14 is situated in the first fluid passage 13S at a location between the cutoff valve 12S and the master cylinder 7 (fluid passage 13A). The hydraulic pressure sensor 14 detects hydraulic pressures at the location where it is situated (master cylinder hydraulic pressure Pm and hydraulic pressure in the positive pressure chamber 20*a* of the stroke simulator 20). Hydraulic pressure sensors 15 (primary system pressure sensor 15P and secondary system pressure sensor 15S) are situated in the first fluid passage 13 at locations between the respective cutoff valves 12 and the respective SOL/V IN 28. The hydraulic pressure sensors 15 detect hydraulic pressures at the locations where they are situated (wheel cylinder hydraulic pressures Pw). A hydraulic pressure sensor 16 is situated in the discharge fluid passage 33 at a location between the discharge portion 34 (check valve 35) of the pump 11 and the communication valves 36. The hydraulic pressure sensor 16 detects hydraulic pressure at the location where it is situated (pump discharge pressure).

The following discussion is about a configuration of an electrical function of the brake control device 1 with a focus on the control unit 5.

Figure 2:
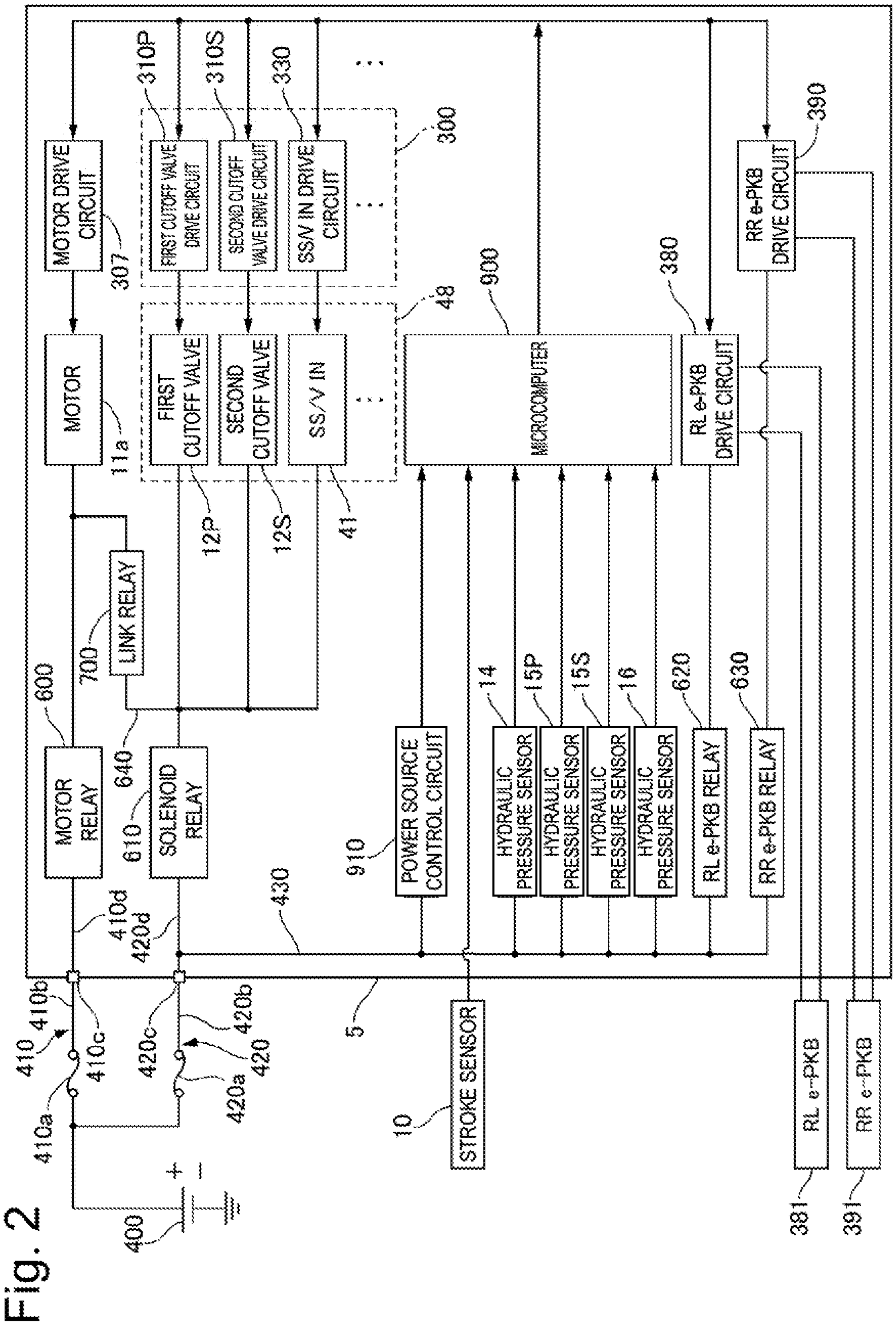
FIG. 2 is a control circuit diagram of the brake control device 1 according to the Embodiment 1.

FIG. 2 is a control circuit diagram of the brake control device 1 according to the Embodiment 1.

The vehicle power source (electric power source) 400 mainly comprises a 12V lead-acid battery and a vehicle generator (alternator). If the vehicle is an electric vehicle, the vehicle electric power source 400 may be used as output of a secondary battery (lithium-ion battery, nickel hydride battery or the like) that is stepped down in voltage by a DC/DC convertor or as a high-capacity condenser, such as an electric double layer capacity (EDLC). Although the vehicle power source 400 comprises one power source in FIG. 2, the vehicle power source 400 may comprise two or more power sources.

Inputted into the control unit 5 are detected values transmitted from the stroke sensor 10 and the hydraulic pressure sensors 14 to 16 and information about a traveling state, which is transmitted from the vehicle side. A microcomputer 900 of the control unit 5 performs information processing in accordance with an internally stored program on the basis of variety of information inputted into the control unit 5. In accordance with a result of the information processing, the microcomputer 900 outputs drive signals to drive circuits (motor drive circuit 307 and a plurality of electromagnetic valve drive circuits 300) of the hydraulic unit 4 and controls behavior of actuators (motor 11*a* and a plurality of electromagnetic valves 48). Specifically, the microcomputer 900 controls the opening/closing of fluid passages by the plurality of electromagnetic valves and the rotation speed of the motor 11*a* (that is, a discharge amount of the pump 11). The wheel cylinder hydraulic pressures Pw of the wheels are thus controlled, which makes it possible to implement boosting control, antilock brake control, brake control for vehicle motion control, automatic brake control, regenerative cooperative brake control, and the like.

The boosting control carries out hydraulic actuation behavior to generate a hydraulic braking force that is not sufficiently generated only by the driver's brake operation force, to thereby aid the brake operation. The antilock brake control represses slip of the wheels (locking tendency) which is caused by braking. The vehicle motion control is a vehicle behavior stabilization control (hereinafter, referred to as ESC) that prevents skidding and the like. The automatic brake control is a preceding vehicle follow-up control or the like. The regenerative cooperative brake control controls the wheel cylinder hydraulic pressures Pw so as to achieve target deceleration (target braking force) in cooperation with a regenerative brake. Electric parking brake (hereinafter, referred to as e-PKB) control controls an RL e-PKB drive circuit (drive circuit) 380 and an RR e-PKB drive circuit (drive circuit) 390 on the basis of the driver's switching operation, vehicle information, and the like, and actuates or cancels an RL e-PKB 381 fixed to the left rear wheel RL and an RR e-PKB 391 fixed to the right rear wheel RR.

A first power source line 410 electrically connects the vehicle power source 400 and a coil of the motor (first load) 11*a*. FIG. 2 illustrates the motor 11*a* inside the control unit 5 for convenience. The first power source line 410 includes a fuse (or a fusible link) 410*a*, a vehicle harness 410*b*, a connector terminal 410*c*, and an internal wire 410*d*. The fuse 410*a* and the vehicle harness 410*b* are situated outside the control unit 5. The internal wire 410*d* is situated inside the control unit 5. The connector terminal 410*c* connects the vehicle harness 410*b* and the internal wire 410*d*.

A second power source line 420 electrically connects the vehicle power source 400 to solenoids of the plurality of electromagnetic valves (second loads) 48, the microcomputer (load control computing function portion) 900, and the e-PKBs 380 and 390. The plurality of electromagnetic valves 48 collectively refer to the electromagnetic valves (first cutoff valve 12P, second cutoff valve 12S, SS/V IN 41, etc.). FIG. 2 illustrates the plurality of electromagnetic valves 48 inside the control unit 5 for convenience. The plurality of electromagnetic valve drive circuits 300 collectively refer to the electromagnetic valve drive circuits (first cutoff valve drive circuit 310P, second cutoff valve drive circuit 310S, SS/V IN drive circuit 330, etc.). The second power source line 420 includes a fuse (or a fusible link) 420*a*, a vehicle harness 420*b*, a connecter terminal 420*c*, and an internal wire 420*d*. The fuse 420*a* and the vehicle harness 420*b* are situated outside the control unit 5. The internal wire 420*d* is situated inside the control unit 5. The connector terminal 420*c* connects the vehicle harness 420*b* and the internal wire 420*d*. Although the power source line is a dual system (first power source line 410 and second power source line 420) in FIG. 2, the power source line may be a triple or more system.

A motor relay 600 functioning as a third connecting function portion is a mechanical relay or a semiconductor component such as a power MOSFET or the like, which is situated in the first power source line 410. The motor relay 600 connects a current channel in response to input of an ON command and disconnects the current channel in response to input of an OFF command. For example, if abnormality is detected by a failsafe logic diagnosis of the microcomputer 900, the OFF command is inputted to the motor relay 600, and the motor relay 600 disconnects the current channel. The motor relay 600 may be a fuse component in which a channel is opened by a mechanical mechanism at time of temperature rise or overcurrent generation, instead of by the command from the microcomputer 900.

A solenoid relay (first relay) 610 functioning as a first connecting function portion is a mechanical relay or a semiconductor component such as a power MOSFET or the like, which is situated in the second power source line 420. The solenoid relay 610 connects a current channel in response to input of an ON command and disconnects the current channel in response to input of an OFF command. For example, if abnormality is detected by a failsafe logic diagnosis of the microcomputer 900, the OFF command is inputted to the motor relay 600, and the motor relay 600 disconnects the current channel. The solenoid relay 610 may be a fuse component in which a channel is opened by a mechanical mechanism at time of temperature rise or overcurrent generation, instead of by the command from the microcomputer 900.

A link line 640 connects a portion of the first power source line 410, which extends between the motor relay 600 and the motor 11*a*, to a portion of the second power source line 420, which extends between the solenoid relay 610 and the plurality of electromagnetic valves 48.

A link relay (second relay) 700 functioning as a second connecting function portion is a switching component, such as a mechanical relay, or a semiconductor component, such as a power MOSFET, which is arranged in the link line 640. The mechanical relay basically connects or disconnects the current channel in both directions. It is also possible to arrange a rectification diode or the like in series with the relay so that the relay connects the current channel in one direction. When an ON command from the microcomputer 900, a power source control circuit 910 mentioned later or the like is inputted to the link relay 700 as a result of a logic diagnosis, the link relay 700 connects the current channel. When an OFF command is inputted to the link relay 700, the link relay 700 disconnects the current channel. If the link relay 700 is a power MOSFET that includes a parasitic diode between a drain and a source, the link relay 700 is so configured that current does not flow through the parasitic diode during the input of the OFF signal, for example, by arranging two power MOSFETs in series and directly connecting drain terminals to each other (drain common) or directly connecting source terminals to each other (source common). Furthermore, if the two power MOSFETs are switched ON/OFF independently of each other in response to separate signals, this allows current to flow in both directions by switching on both the power MOSFETs and allows the current to flow only in one direction through the parasitic diode by switching on one of the power MOSFETs.

For example, when power source is supplied through the second power source line 420 to the motor 11*a*, flowing current may be limited by arranging a resistor or the like in series with the link relay 700 so that the current does not exceed a current limit value that is previously set in the power source line. An effect of the foregoing limitation is that, when all the flowing current channels are designed according to maximum load characteristics, there is no need to employ unnecessary and excessive components that do not contribute to anything if no failure occurs. Needless to say, essential performance can be provided even if the current limitation is set, and the current is controlled with load performance degraded.

The motor drive circuit 307 controls the motor 11*a* in a closed or open loop in accordance with a drive signal transmitted from the microcomputer 900. A plurality of electromagnetic valve drive circuits (first cutoff valve drive circuit 310P, second cutoff valve drive circuit 310S, SS/V IN drive circuit 330, etc.) control the plurality of electromagnetic valves 48 in a closed or open loop in accordance with the drive signals transmitted from the microcomputer 900.

The power source control circuit 910 includes a constant voltage control function that maintains voltage at 3.3V, 5V or another value which is used in the control unit 5. The power source control circuit 910 normally uses electric power that is inputted through the second power source line 420 to the power source control circuit 910, to thereby provide each power source. In addition, the power source control circuit 910 has a function of monitoring the microcomputer 900, a function of detecting an ON operation of an ignition switch and launching a system, and other like functions.

A third power source line 430 connects a portion of the second power source line 420, which extends between the connector terminal 410*c* and the solenoid relay 610, to the power source control circuit 910, the RL e-PKB drive circuit 380, and the RR e-PKB drive circuit 390.

An RL e-PKB relay 620 and an RR e-PKB relay 630, which function as a fourth connecting function portion, are situated in the third power source line 430. The RL e-PKB relay 620 and the RR e-PKB relay 630 each represent a semiconductor that opens a current channel in response to input of an OFF signal due to a logic diagnosis during a failsafe operation, a switching component, such as a relay, or a fuse component in which a channel is opened by a mechanical mechanism at time of temperature rise or overcurrent generation. The e-PKB drive circuits 380 and 390 are H-bridge drive circuit configurations. The e-PKB drive circuits 380 and 390 control the e-PKBs 381 and 391 in both directions and switch the e-PKBs between actuation and de-actuation.

The following description explains a method of diagnosing a failure in the motor relay 600, the solenoid relay 610, and the link relay 700.

Figure 3:
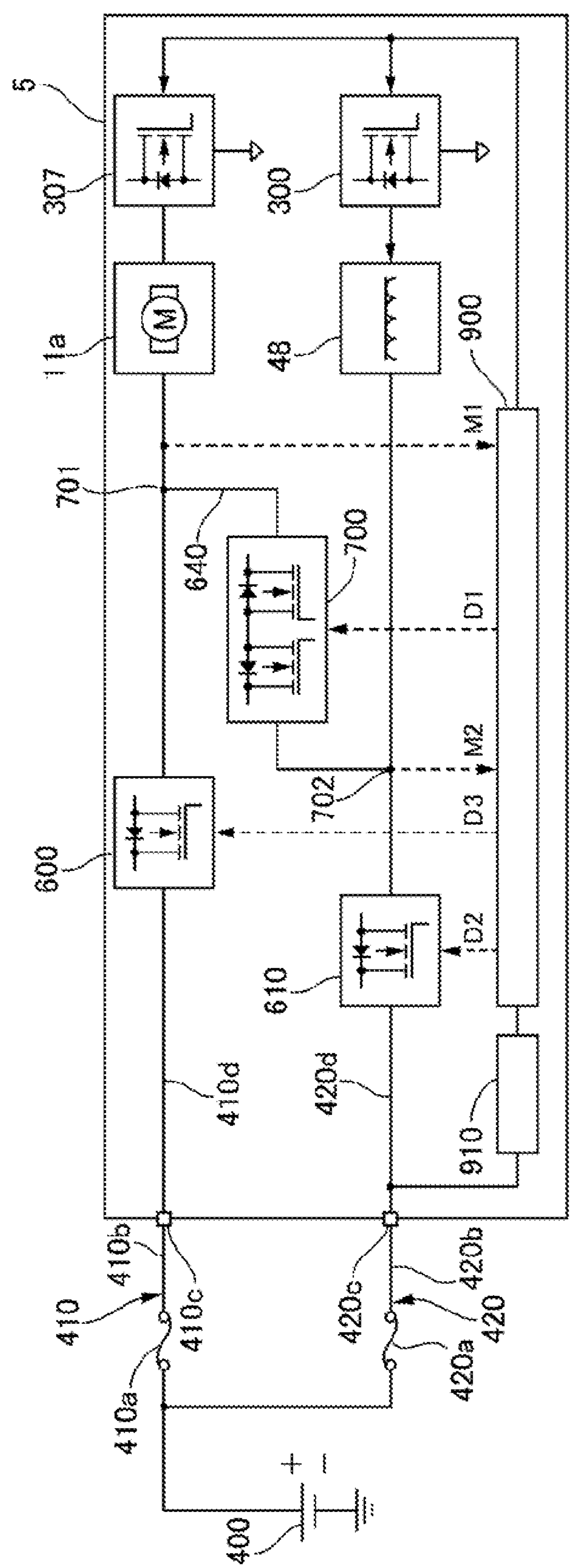
FIG. 3 is a schematic diagram of the brake control device 1 which shows a method of diagnosing a failure in a motor relay 600, a solenoid relay 610, and a link relay 700.

FIG. 3 is a schematic diagram of the brake control device 1 which shows the method of diagnosing a failure in the motor relay 600, the solenoid relay 610, and the link relay 700. FIG. 3 only shows elements necessary for the explanation.

The microcomputer 900 controls a drive signal D1 of the link relay 700, a drive signal D2 of the solenoid relay 610, and a drive signal D3 of the motor relay 600. The microcomputer 900 applies digital conversion processing to analog voltage signals M1 and M2 of both terminal points 701 and 702 of the link relay 700 using an in-built A/D convertor. The microcomputer 900 monitors both terminal voltages of the link relay 700 through failsafe logic processing. The link relay 700 monitors abnormality through a failure diagnosis algorithm that checks against monitoring results of both the terminal voltages of the link relay 700 when the drive signal D1 of the link relay 700, the drive signal D2 of the solenoid relay 610, and the drive signal D3 of the motor relay 600 are sequentially switched.

Figure 4:
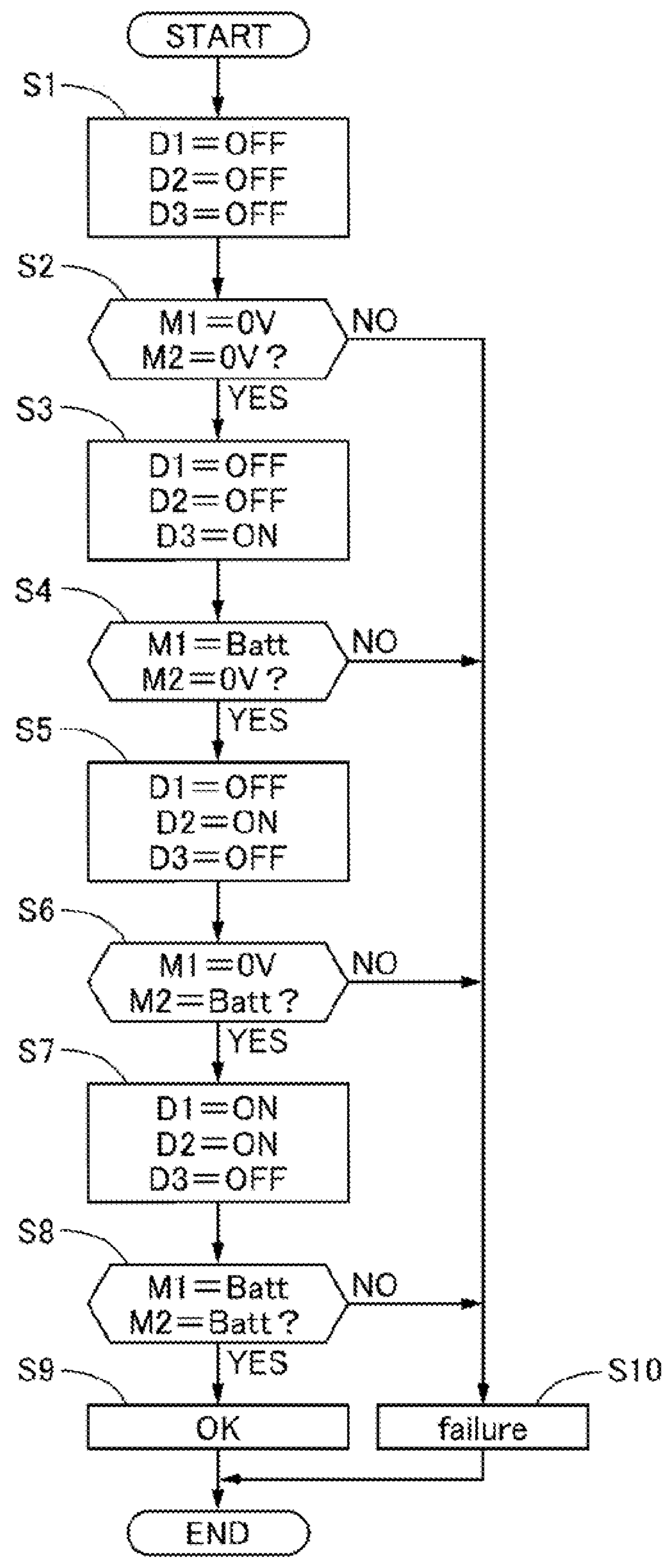
FIG. 4 is a flowchart showing a flow of failure diagnosis processing in a microcomputer 900.

FIG. 4 is a flowchart showing a flow of the failure diagnosis processing in the microcomputer 900. The processing is performed immediately after the system is launched. For simplicity, the following description explains a situation where a mechanical relay is employed as the link relay 700. If the link relay 700 is so configured that two power MOSFETs are arranged in series, such a configuration only complicates a procedure, and a basic idea stays the same.

At Step S1, all the drive signals D1, D2, and D3 are switched OFF.

At Step S2, a determination is made as to whether the analog voltage signals M1 and M2 are voltages equivalent to 0V. If the determination is YES, the flow advances to Step S3. If NO, the flow advances to Step S10.

At Step S3, the drive signals D1 and D2 are switched OFF, and the drive signal D3 is switched ON. In other words, only the motor relay 600 is switched ON.

At Step S4, a determination is made as to whether the analog voltage signal M1 is a voltage equivalent to the vehicle power source 400 and whether the analog voltage signal M2 is a voltage equivalent to 0V. If the determination is YES, the flow advances to Step S5. If NO, the flow advances to Step S10.

At Step S5, the drive signals D1 and D3 are switched OFF, and the drive signal D2 is switched ON. In other words, only the solenoid relay 610 is switched ON.

At Step S6, a determination is made as to whether the analog voltage signal M1 is a voltage equivalent to 0V and whether the analog voltage signal M2 is a voltage equivalent to the vehicle power source 400. If the determination is YES, the flow advances to Step S7. If NO, the flow advances to Step S10.

At Step S7, the drive signals D1 and D2 are switched ON, and the drive signal D3 is switched OFF. In other words, the solenoid relay 610 and the link relay 700 are switched ON, and the motor relay 600 is switched OFF.

At Step S8, a determination is made as to whether the analog voltage signals M1 and M2 are voltages equivalent to the vehicle power source 400. If the determination is YES, the flow advances to Step S9. If NO, the flow advances to Step S10.

Step S9 determines OK (no abnormality).

Step S10 determines that there is abnormality. Specifically, if the determination at Step S2 is NO, it is determined that the motor relay 600 or the solenoid relay 610 is stuck in the ON position. If the determination at Step S4 is NO, it is determined that there is a failure in the first power source line 410, such as a failure in which the motor relay 600 is stuck in the OFF position. If the determination at Step S6 is NO, it is determined that there is a failure in the second power source line 420, such as a failure in which the solenoid relay 610 is stuck in the OFF position. If the determination at Step S8 is NO, it is determined that there is a failure in the link relay 700.

The following description explains behavior of the control unit 5 in a situation where there is a failure in the power source lines. The link relay 700 is so configured that two power MOSFETs 700*a* and 700*b* are arranged in series.

Figure 5:
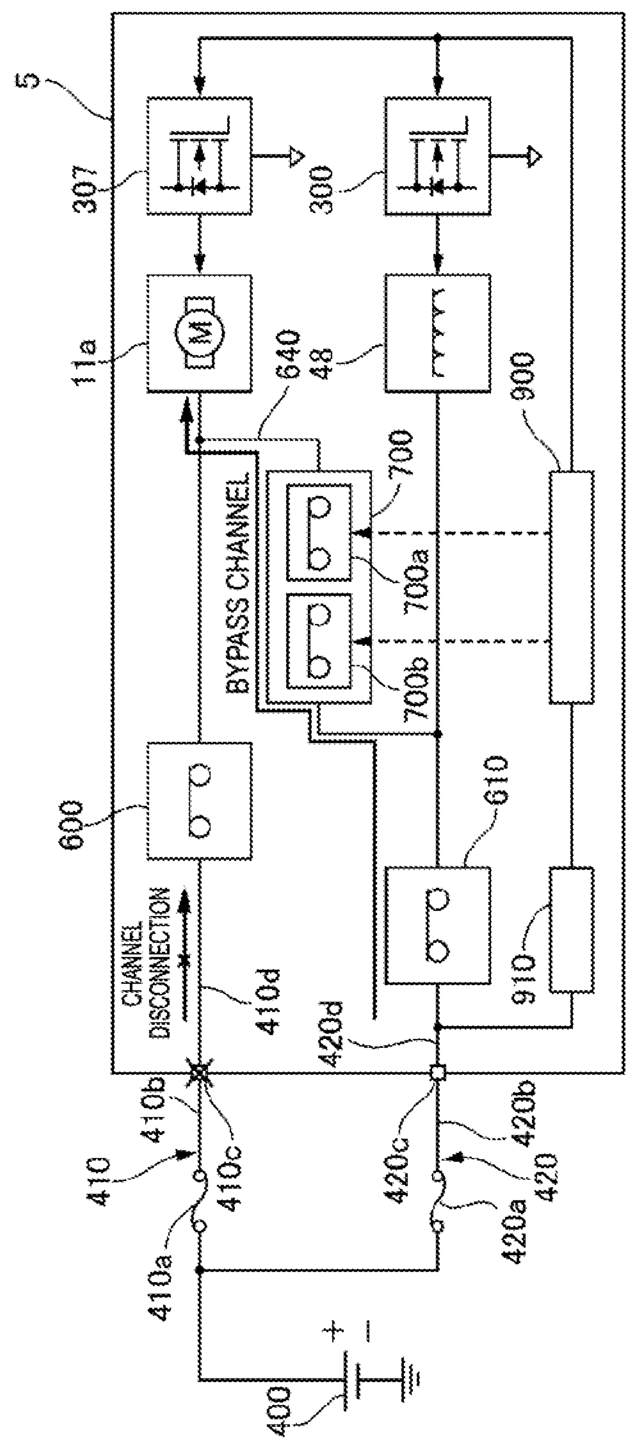
FIG. 5 is a control circuit diagram showing behavior of a control unit 5 according to the Embodiment 1 in a situation where a contact failure occurs in a connecter terminal 410*c* of a first power source line 410.

FIG. 5 is a control circuit diagram showing the behavior of the control unit 5 according to the Embodiment 1 in a situation where a contact failure occurs in the connecter terminal 410*c* of the first power source line 410. FIG. 5 only shows elements necessary for the explanation.

When the contact failure occurs in the connector terminal 410*c*, the analog voltage signal M1 when only the motor relay 600 is switched ON does not reach a voltage corresponding to the vehicle power source 400. In the flowchart of FIG. 4, therefore, the flow advances from Step S4 to Step S10 which determines that the first power source line 410 is failed. In such a case, the vehicle power source 400 is supplied from the second power source line 420 to the motor 11*a* through a bypass channel shown by an arrow in FIG. 5.

According to the Embodiment 1, the link line 640 connects the portion of the first power source line 410, which extends between the motor relay 600 and the motor 11*a*, to the portion of the second power source line 420, which extends between the solenoid relay 610 and the plurality of electromagnetic valves.

Figure 6:
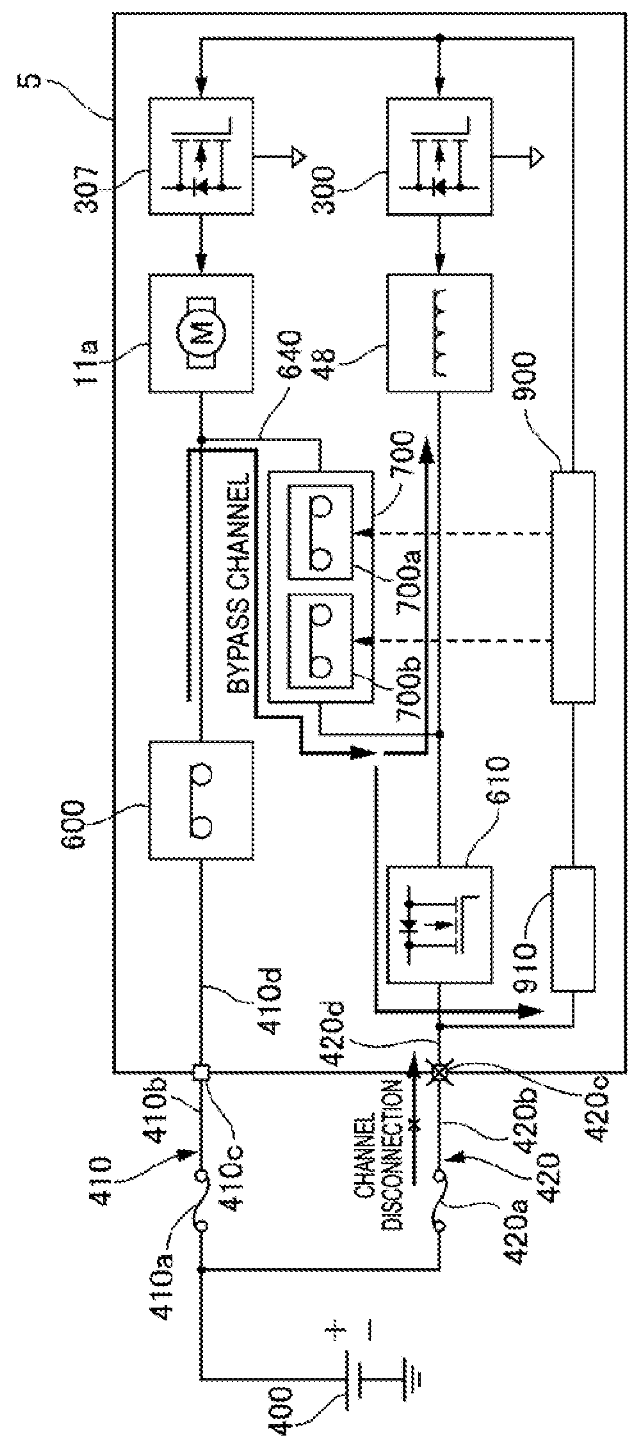
FIG. 6 is a control circuit diagram showing behavior of the control unit 5 according to the Embodiment 1 in a situation where a contact failure occurs in a connector terminal 420*c* of a second power source line 420.

FIG. 6 is a control circuit diagram showing behavior of the control unit 5 according to the Embodiment 1 in a situation where a contact failure occurs in the connector terminal 420*c* of the second power source line 420. FIG. 6 only shows elements necessary for the explanation.

When the contact failure occurs in the connector terminal 420*c*, the analog voltage signal M2 when only the solenoid relay 610 is switched ON does not reach a voltage corresponding to the vehicle power source 400. In the flowchart of FIG. 4, therefore, the flow advances from Step S6 to Step S10 which determines that the second power source line 420 is failed. In such a case, the vehicle power source 400 is supplied from the first power source line 410 to the microcomputer 900 and the plurality of electromagnetic valves 48 through bypass channels shown by arrows in FIG. 6.

Figure 7:
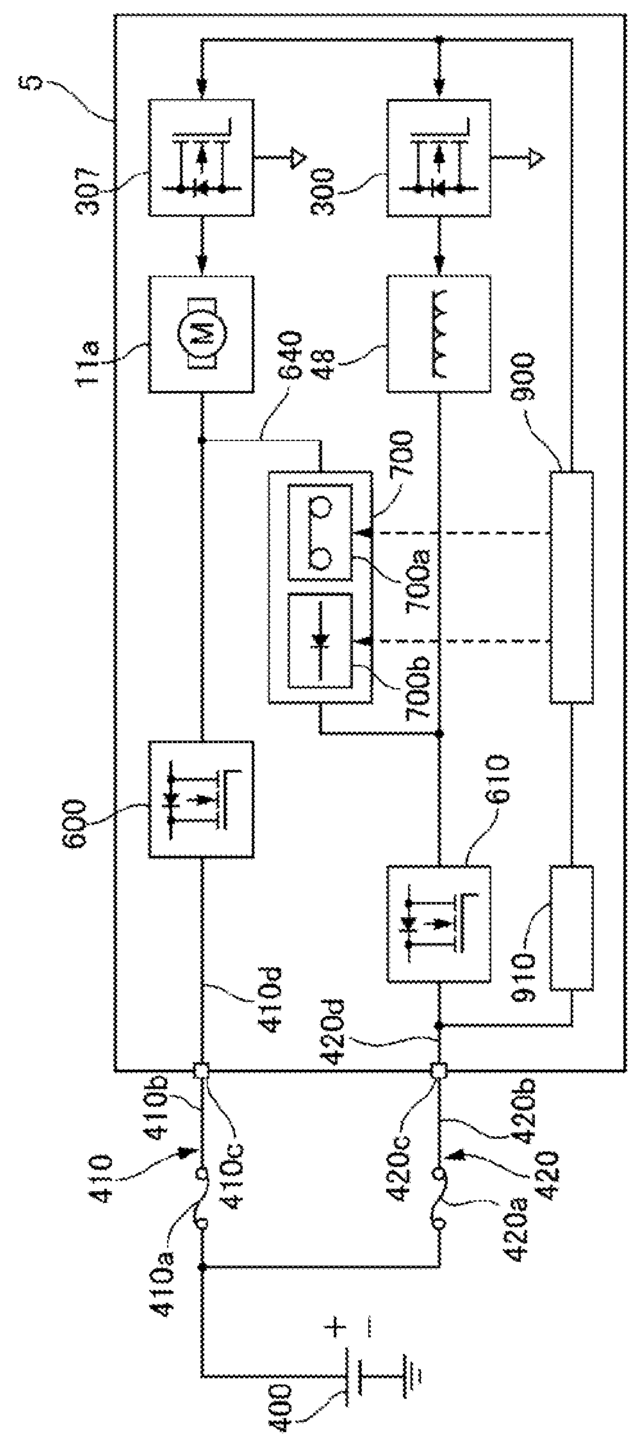
FIG. 7 is a schematic diagram of the brake control device 1, which shows an example in which a link relay 700 is set to a unidirectional mode.

The microcomputer 900 is reset if an operating power source becomes insufficient. The reset of the microcomputer 900 switches off the solenoid relay 610 and the link relay 700 and raises a possibility that the bypass channel does not function. It is therefore desired that the link relay 700 be normally ON or at least that a unidirectional bypass channel be formed to extend from the first power source line 410. To that end, as illustrated in FIG. 7, for example, the first power MOSFET 700*a* and the second power MOSFET 700*b* of the link relay 700 may be normally closed and normally open, respectively. The first power MOSFET 700*a* and the second power MOSFET 700*b* are thus kept ON and OFF, respectively, during the reset of the microcomputer 900, making the parasitic diode function. If the connector terminal 420*c* is disconnected, the bypass channel functions immediately and reliably. This prevents the microcomputer 900 from being mistakenly reset.

Operation and advantageous effects of the Embodiment 1 will be now discussed.

The control unit 5 of the Embodiment 1 comprises the link line 640 connecting the portion of the first power source line 410, which extends between the motor relay 600 and the motor 11*a*, and the portion of the second power source line 420, which extends between the solenoid relay 610 and the plurality of electromagnetic valves, and the link relay 700 arranged in the link line 640. In the event of a failure of the first power source line 410 or the second power source line 420, the link relay 700 is switched on, and this allows the vehicle power source 400 to be supplied through the solenoid relay 610 and the link relay 700 to the loads (motor 11*a* or the plurality of electromagnetic valves 48) located in the failed power source line. In this way, the Embodiment 1 represses complication of a power circuit unlike the conventional art that provides a redundant power supply with respect to each load.

According to the Embodiment 1, if the first power source line 410 is failed, the bypass channel is formed, which supplies the vehicle power source 400 to the motor 11*a* through the solenoid relay 610. An assumable configuration as a comparative example of the Embodiment 1 includes the link line 640 connected to a portion of the second power source line 420, which extends between the connector terminal 420*c* and the solenoid relay 610, that is, a portion extending from the solenoid relay 610 toward the vehicle power source 400. According to the comparative example, the analog voltage signal M1 is normally a voltage equivalent to the vehicle power source 400, regardless of the ON/OFF position of the solenoid relay 610. In the comparative example, therefore, it is difficult to detect a failure in the link relay 700 on the basis of a monitoring result of voltages at both terminals of the link relay 700.

According to the Embodiment 1, since the link relay 640 is connected to the portion of the second power source line 420, which extends between the solenoid relay 610 and the plurality of electromagnetic valves 48, that is, a portion extending from the solenoid relay 610 toward the plurality of electromagnetic valves 48. A failure in the link relay 700 is therefore detected without difficulty using a failure diagnosing method illustrated in FIG. 4.

The link relay 700 according to the Embodiment 1 is arranged in a terminal of a load located most downstream in the power source lines 410 and 420 between the vehicle power source 400 and the loads (motor 11*a* and the plurality of electromagnetic valves 48). This makes it possible to form the bypass channels even if there occurs a channel disconnection in any portion of the power source lines 410 and 420.

The control unit 5 includes the microcomputer 900 configured to control the drive signals D2 and D1 of the solenoid relay 610 and the link relay 700 and detect and monitor the voltages at both the terminal points 701 and 702 of the link relay 700. A failure in the link relay 700 is detected by monitoring the voltages at both the terminals of the link relay 700. The microcomputer 900 detects and monitors voltages at both the terminal points 701 and 702 when the solenoid relay 610 is switched ON and voltages at both the terminal points 701 and 702 when the solenoid relay 610 is switched OFF. This makes it possible to make a distinction between a failure in the solenoid relay 610 and a failure in the link relay 700.

The first power source line 410 is connected to the motor 11*a* for driving the pump 11 that discharges the brake fluid in the brake control device 1. The second power source line 420 is connected to the plurality of electromagnetic valves 48 that adjust an amount of the brake fluid supplied to the wheel cylinders 2. In general, a configuration including two power source lines connected to two actuators (loads) can be seen in a control unit applied to a brake control device. A reason for dividing the power source line is that current supplied to a coil of a motor and current supplied to solenoids of electromagnetic valves are different in magnitude. Another reason is that, even if the motor 11*a* is deactivated due to cease of the power supply from the first power source line 410 as degradation behavior after the occurrence of a failure, the ESC drives some of the hydraulic electromagnetic valves to continue at least a vehicle's electronically controlled brake (EBD) and thus safely applies braking. Meanwhile, there has been increasing demand for redundancy of power supply in brake control devices to deal with an electric parking brake and automatic operation. Under the circumstances, the redundancy of power supply which is materialized by the link line 640 and the link relay 700 shown in the Embodiment 1 is suitable for making redundant the power supply in the control unit 5 applied to the brake control device 1.

The motor relay 600 arranged in the first power source line 410 is provided. The link line 640 connects the portion of the second power source line 420, which extends between the solenoid relay 610 and the plurality of electromagnetic valves 48, to the portion of the first power source line 410, which extends between the motor relay 600 and the motor 11*a*. Such a configuration allows the power supply to the motor 11*a* to be stopped by switching off the motor relay 600, for example, when abnormality in the brake control device 1 is detected at the failsafe logic diagnosis of the microcomputer 900. This makes it possible to avoid malfunction of the motor 11*a*.

There are provided the third power source line 430 that diverges from a portion of the vehicle power source 400, which extends between the vehicle power source 400 and the solenoid relay 610, and is connected to the e-PKB drive circuits 380 and 390 for driving the e-PKB 381 and 391 that provide a braking force to each wheel; and the e-PKB relays 620 and 630 arranged in the third power source line 430. Such a configuration makes it possible to materialize the integrated control unit in which one control unit 5 includes the electric parking brake drive circuits.

The microcomputer 900 that controls the drive signal D1 of the link relay 700 is provided. The microcomputer 900 controls the link relay 700 so as to connect or disconnect the link relay 700. While connecting the link relay 700, the microcomputer 900 controls the current so that the current flows in both directions or one direction. Consequently, a proper determination is made as to whether the link relay 700 is ON or OFF, and failures detected by the failsafe are dealt with in a most proper way in accordance with details of the failures. For example, if the motor 11*a* is short-circuited, and excessive current flows to the first power source line 410 when the motor drive circuit 307 is switched ON, it is not preferable that the second power source line 420 in a normal state be connected. In such a case, the excessive current of the second power source line 420 is prevented by controlling the link relay 700 so that the current flows in one direction. The loads (the plurality of electromagnetic valves 48 and the like) connected to the second power source line 420 are accordingly protected.

Embodiment 2

Embodiment 2 is the same as the Embodiment 1 in basic configuration. The following description therefore only refers to matters different from the Embodiment 1.

FIG. 8 is a control circuit diagram of a brake control device 1 according to the Embodiment 2.

A link line 650 connects a portion of a first power source line 410, which extends between a connector terminal 410*c* and a motor 11*a*, to a portion of a second power source line 420, which extends between a connector terminal 420*c* and a solenoid relay (third relay) 610.

A first logic circuit 705 functioning as a second connecting function portion is equivalent to the link relay 700 of the Embodiment 1. The first logic circuit 705 is a switching component, such as a mechanical relay, or a semiconductor component, such as a power MOSFET, which is arranged in the link line 650. The first logic circuit 705 is so configured that the mechanical relay basically connects or disconnects a current channel in both directions, but instead, may be so configured that the mechanical relay connects the current channel in one direction by arranging a rectification diode or the like in series with the relay. The first logic circuit 705 connects the current channel in response to input of an ON command from a microcomputer 900, a power source control circuit 910 or the like on the basis of a logic diagnosis, and disconnects the current channel in response to input of an OFF command.

A second logic circuit 605 functioning as a first connecting function portion is situated in the second power source line 420 at a location between the connector terminal 420*c* and the solenoid relay 610. The second logic circuit 605 is a semiconductor component, such as a rectification diode and a power MOSFET. If the second logic circuit 605 is a power MOSFET, there are two options. One of the options is to arrange an anode of a drain-source parasitic diode on a vehicle power source 400 side and switch on the second logic circuit 605 by driving the microcomputer 900. The other option is to use the second logic circuit 605 as a diode. A purpose of switching on the second logic circuit 605 is to repress heat generated by working current of the plurality of electromagnetic valves or the like.

The third power source line 430 connects a portion of the second power source line 420, which extends between the second logic circuit 605 and the solenoid relay 610, to the power source control circuit 910, an RL e-PKB drive circuit 380, and an RR e-PKB drive circuit 390.

The following description explains behavior of the control unit 5 in a situation where the power source line is failed.

Figure 9:
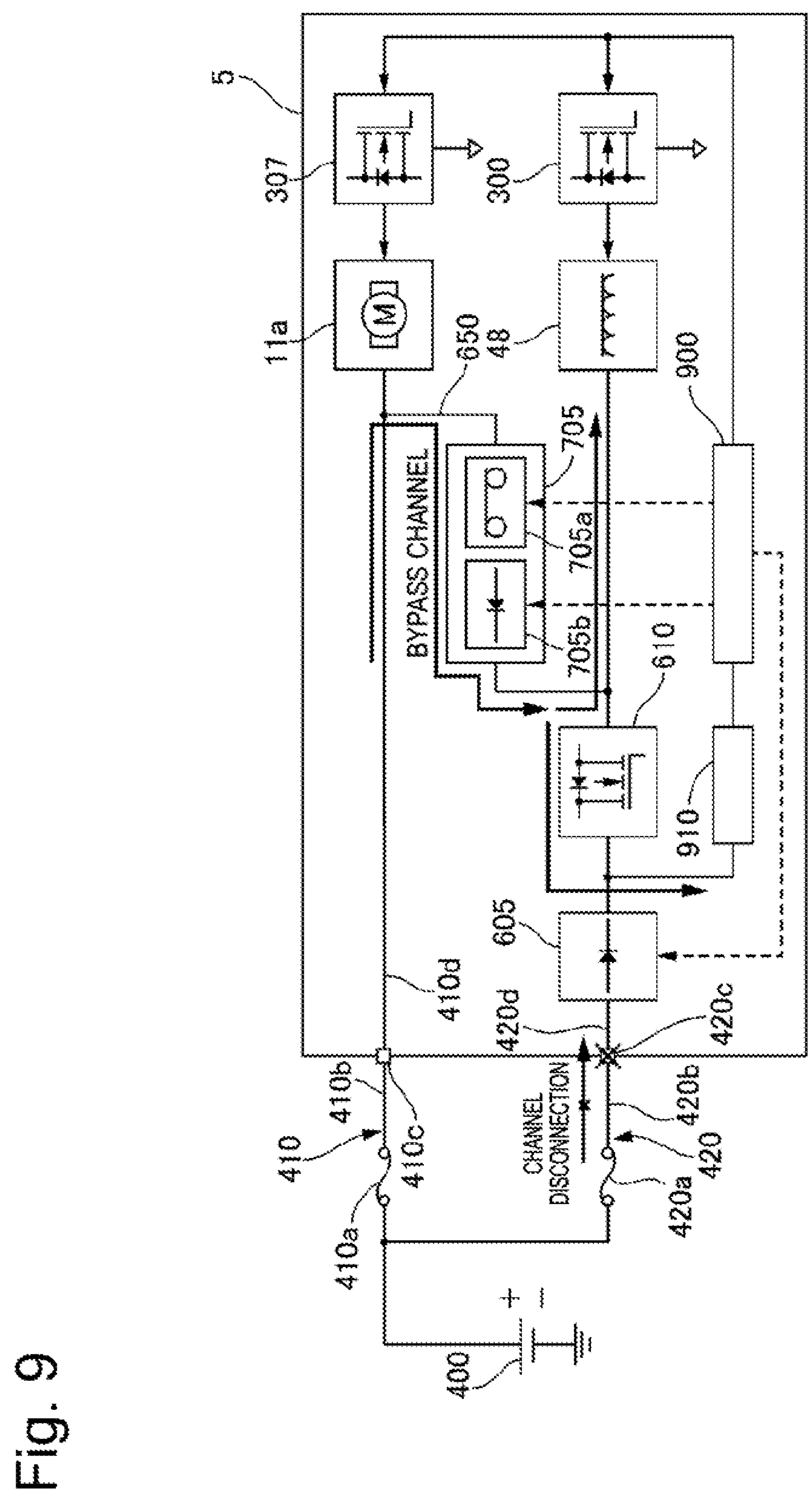
FIG. 9 is a control circuit diagram showing behavior of a control unit 5 according to the Embodiment 2 in a situation where a contact failure occurs in a connector terminal 420*c* of a second power source line 420.

FIG. 9 is a control circuit diagram showing the behavior of the control unit 5 according to the Embodiment 2 in a situation where a contact failure occurs in the connector terminal 420*c* of the second power source line 420. FIG. 9 only shows elements necessary for the explanation.

When a contact failure occurs in the connector terminal 420*c*, the vehicle power source 400 is supplied from the first power source line 410 to a plurality of electromagnetic valves 48 and the microcomputer 900 through bypass channels shown by arrows in FIG. 9.

Operation and advantageous effects of the Embodiment 2 will be now discussed.

In the control unit 5 of the Embodiment 2, the first logic circuit 705 and the second logic circuit 605 each have a diode OR function. The plurality of electromagnetic valves 48 and the microcomputer 900 are supplied with power source from the first power source line 410 or the second power source line 420, whichever is higher in voltage. In other words, the first logic circuit 705 and the second logic circuit 605 function as a pair of logic circuits. The pair of logic circuits is used to supply power source from a dual system power source line (first power source line 410 and second power source line 420) to each load.

For example, in the event of voltage decrease in the first power source line 410 as a result of disconnection of the first power source line 410 or the like, the first logic circuit 705 is switched on, and this allows the power source to be supplied from the second power source line 420 through the link line 650 to the motor 11*a*.

According to the Embodiment 2, for example, even if the second power source line 420 is in contact with a vehicle body ground (so-called a ground fault), the power source is allowed to be supplied from the first power source line 410 through the bypass channels to the microcomputer 900 by setting the second logic circuit 605 to work as a diode. This prevents the microcomputer 900 from being reset.

The solenoid relay 610 is provided in a portion of the second power source line 420, which extends between the first logic circuit 705 and the plurality of electromagnetic valves 48. The link line 650 connects a portion of the second power source line 420, which extends between the first logic circuit 705 and the solenoid relay 610, to the first power source line 410. In other words, since the first logic circuit 705 and the solenoid relay 610 are separately situated, it is possible to achieve redundancy of the power source lines using the first logic circuit 705 and the second logic circuit 605 in the form of the pair of logic circuits.

Other Embodiments

The Embodiments for carrying out the invention have been discussed. However, specific configurations of the invention are not limited to those of the Embodiments discussed above. Any configurations may be included in the scope of the invention without deviating from the gist of the invention.

The Embodiment 1 does not necessarily have to include the motor relay 600. The motor relay 600 may be omitted from the Embodiment 1. The Embodiment 2 may be so configured that the motor relay 600 is situated between the connector terminal 410*c* of the first power source line 410 and a connecting position of the first power source line 410 and the link line 650.

The electronic control unit of the invention may also be applied to other systems than brake control devices, and in such a case, provides the same operation and advantageous effects as the Embodiments.

Technical ideas that are understood from the above-discussed Embodiments are as below.

The electronic control unit according to one mode comprises a first power source line connecting an electric power source and a first load; a second power source line connecting the electric power source and a second load; a first connecting function portion arranged in the second power source line; a link line connecting a portion of the second power source line, which extends between the first connecting function portion and the second load, to the first power source line; and a second connecting function portion arranged in the link line.

In a more preferable mode according to the aforementioned mode, the first connecting function portion is a first relay, and the second connecting function portion is a second relay.

In another preferable mode according to either one of the aforementioned modes, the first connecting function portion is a first logic circuit, and the second connecting function portion is a second logic circuit.

In still another preferable mode according to any one of the aforementioned modes, the electronic control unit comprises a load control computing function portion configured to control a drive signal of the first connecting function portion and a drive signal of the second connecting function portion and also detect and monitor voltages at both terminals of the second connecting function portion. The load control computing function portion detects and monitors the voltages when the first connecting function portion is connected and the voltages when the first connecting function portion is disconnected.

In still another preferable mode according to any one of the aforementioned modes, the first load is a motor configured to drive a pump that discharges brake fluid used in a brake control device, and the second load is an electromagnetic valve configured to adjust an amount of the brake fluid supplied to wheel cylinders.

In still another preferable mode according to any one of the aforementioned modes, the first connecting function portion is a first relay.

In still another preferable mode according to any one of the aforementioned modes, the second connecting function portion is a second relay.

In still another preferable mode according to any one of the aforementioned modes, the electronic control unit comprises a third connecting function portion arranged in the first power source line. The link line connects a portion of the second power source line, which extends between the first connecting function portion and the second load, to a portion of the first power source line, which extends between the third connecting function portion and the first load.

In still another preferable mode according to any one of the aforementioned modes, the electronic control unit comprises a third power source line that diverges from a portion of the first power source line, which extends between the electric power source and the first connecting function portion, the third power source being connected to a drive circuit for driving a parking brake that provides a braking force to vehicle wheels; and a fourth connecting function portion arranged in the third power source line.

In still another preferable mode according to any one of the aforementioned modes, the first connecting function portion is a first logic circuit, and the second connecting function portion is a second logic circuit.

In still another preferable mode according to any one of the aforementioned modes, the electronic control unit comprises a third relay in a portion of the second power source line, which extends between the first logic circuit and the second load. The link line connects a portion of the second power source line, which extends between the first logic circuit and the third relay, to the first power source line.

In still another preferable mode according to any one of the aforementioned modes, the first logic circuit and the second logic circuit function as a pair of logic circuits.

In still another preferable mode according to any one of the aforementioned modes, the electronic control unit comprises a load control computing function portion configured to control a drive signal of the second connecting function portion. The load control computing function portion controls the second connecting function portion so as to connect or disconnect the second connecting function portion. While connecting the second connecting function portion, the load control computing function portion controls a current flow so that current flows in both directions or one direction.

In still another preferable mode according to any one of the aforementioned modes, the electronic control unit comprises a load control computing function portion configured to control a drive signal of the first connecting function portion and a drive signal of the second connecting function portion and also detect and monitor voltages at both terminals of the second connecting function portion. The load control computing function portion detects and monitors the voltages when the first connecting function portion is connected and the voltages when the first connecting function portion is disconnected.

From another aspect, a brake control device according to one mode comprises a hydraulic unit and a control unit. The hydraulic unit includes connecting fluid passages connected to wheel cylinders, electromagnetic valves situated in the connecting fluid passages, and a pump that is driven by a motor and capable of supplying brake fluid to the connecting fluid passages. The control unit includes a first power source line connecting an electric power source and the motor, a second power source line connecting the electric power source and the electromagnetic valves, a first connecting function portion arranged in the second power source line, a link line connecting a portion of the second power source line, which extends between the first connecting function portion and the electromagnetic valves, to the first power source line, and a second connecting function portion arranged in the link line.

The invention is not limited to the embodiments and may be modified in various ways. For example, the embodiments are intended to describe the invention in detail for easy understanding and do not necessarily have to include all the configurations mentioned above. The configuration of each embodiment may be partially replaced with another configuration or incorporated with another configuration. It is also possible to incorporate, omit or replace a part of the configuration of one of the embodiments into, from or with the configurations of another one of the embodiments.

The present application claims priority under Japanese Patent Application No. 2018-5509 filed on Jan. 17, 2018. The entire disclosure of Japanese Patent Application No. 2018-5509 filed on Jan. 17, 2018 including the description, claims, drawings and abstract, is incorporated herein by reference in its entirety.

REFERENCE SIGN LIST

1 brake control device
2 wheel cylinder
4 hydraulic unit
5 control unit (electronic control unit)
11 pump
**11*a*** motor (first load)
12 cutoff valve (electromagnetic valve)
13 first fluid passage (connecting fluid passage)
28 SOL/V IN (electromagnetic valve)
48 a plurality of electromagnetic valves (second loads)
380, 390 e-PKB drive circuit (drive circuit)
381, 391 e-PKB (parking brake)
400 vehicle power source (electric power source)
410 first power source line
420 second power source line
430 third power source line
600 motor relay (third connecting function portion)
605 second logic circuit (second connecting function portion)
610 solenoid relay (first connecting function portion, first relay)
610 solenoid relay (third relay)
620, 630 e-PKB relay (fourth connecting function portion)
640 link line
650 link line
700 link relay (second connecting function portion, second relay)
705 first logic circuit (first connecting function portion)
900 microcomputer (load control computing function portion)

The invention claimed is:

1. An electronic control unit comprising:

a first power source line that connects an electric power source and a first load;

a second power source line that connects the electric power source and a second load;

a first connecting function portion arranged in the second power source line;

a link line that connects a portion of the second power source line, which extends between the first connecting function portion and the second load, to the first power source line; and a second connecting function portion arranged in the link line, wherein the electronic control unit comprises a load control computing function portion configured to control a drive signal of the first connecting function portion and a drive signal of the second connecting function portion and also detect and monitor voltages at both terminals of the second connecting function portion, and wherein the load control computing function portion detects and monitors the voltages at both the terminals of the second connecting function portion when the first connecting function portion is connected and the voltages at both the terminals of the second connecting function portion when the first connecting function portion is disconnected.

2. The electronic control unit according to claim 1, wherein the first connecting function portion is a first relay, and the second connecting function portion is a second relay.

3. The electronic control unit according to claim 1, wherein the first connecting function portion is a first logic circuit, and the second connecting function portion is a second logic circuit.

4. The electronic control unit according to claim 1, wherein the first load is a motor configured to drive a pump that discharges brake fluid used in a brake control device, and wherein the second load is an electromagnetic valve configured to adjust an amount of the brake fluid supplied to wheel cylinders.

5. The electronic control unit according to claim 4, wherein the first connecting function portion is a first relay.

6. The electronic control unit according to claim 5, wherein the second connecting function portion is a second relay.

7. The electronic control unit according to claim 6, wherein the electronic control unit comprises a third connecting function portion arranged in the first power source line, and wherein the link line connects a portion of the second power source line, which extends between the first connecting function portion and the second load, to a portion of the first power source line, which extends between the third connecting function portion and the first load.

8. The electronic control unit according to claim 5, comprising:

a third power source line that diverges from a portion of the second power source line, which extends between the electric power source and the first connecting function portion, the third power source being connected to a drive circuit for driving a parking brake that provides a braking force to vehicle wheels, and a fourth connecting function portion arranged in the third power source line.

9. The electronic control unit according to claim 4, wherein the first connecting function portion is a first logic circuit, and the second connecting function portion is a second logic circuit.

10. The electronic control unit according to claim 9, comprising:

a third relay in a portion of the second power source line, which extends between the first logic circuit and the second load, wherein the link line connects a portion of the second power source line, which extends between the first logic circuit and the third relay, to the first power source line.

11. The electronic control unit according to claim 9, wherein the first logic circuit and the second logic circuit function as a pair of logic circuits.

12. The electronic control unit according to claim 4, comprising:

a load control computing function portion configured to control a drive signal of the second connecting function portion, the load control computing function portion being configured to control the second connecting function portion so as to connect or disconnect the second connecting function portion, and also configured to control a current flow so that current flows in both directions or one direction while connecting the second connecting function portion.

13. The electronic control unit according to claim 4, comprising:

a load control computing function portion configured to control a drive signal of the first connecting function portion and a drive signal of the second connecting function portion and also detect and monitor voltages at both terminals of the second connecting function portion, the load control computing function portion being configured to detect and monitor the voltages when the first connecting function portion is connected and the voltages when the first connecting function portion is disconnected.

14. A brake control device comprising:

a hydraulic unit and a control unit, the hydraulic unit including:

connecting fluid passages connected to wheel cylinders;

electromagnetic valves situated in the connecting fluid passages; and a pump that is driven by a motor and capable of supplying brake fluid to the connecting fluid passages, the control unit including:

a first power source line that connects an electric power source and the motor;

a second power source line that connects the electric power source and the electromagnetic valves;

a first connecting function portion arranged in the second power source line;

a link line that connects a portion of the second power source line, which extends between the first connecting function portion and the electromagnetic valves, to the first power source line; and a second connecting function portion arranged in the link line, wherein the electronic control unit comprises a load control computing function portion configured to control a drive signal of the first connecting function portion and a drive signal of the second connecting function portion and also detect and monitor voltages at both terminals of the second connecting function portion, and wherein the load control computing function portion detects and monitors the voltages at both the terminals of the second connecting function portion when the first connecting function portion is connected and the voltages at both the terminals of the second connecting function portion when the first connecting function portion is disconnected.

* * * * *